April 6, 1943.  L. C. LUDBROOK  2,316,008
ELECTRIC CONTROL CIRCUIT
Filed Nov. 12, 1941

Inventor:
Leslie C. Ludbrook,
by Harry E. Dunham
His Attorney.

Patented Apr. 6, 1943

2,316,008

UNITED STATES PATENT OFFICE 2,316,008

ELECTRIC CONTROL CIRCUITS

Leslie Carter Ludbrook, near Rugby, England, assignor to General Electric Company, a corporation of New York Application November 12, 1941, Serial No. 418,795
In Great Britain December 12, 1940

13 Claims. (Cl. 171—229)

My invention relates to electric control circuits, and more particularly to control circuits for controlling the phase of an alternating voltage with respect to the voltage of an alternating current source.

It is frequently desirable in electric control systems to provide a simple arrangement for controlling the phase of an output voltage with respect to the voltage of an associated alternating current source. Heretofore the arrangements which have been provided for obtaining this variable phase relationship have involved apparatus of a rather complicated nature and have not been as positive and precise in operation as many instances required. In accordance with the teachings of my invention described hereinafter, I provide new and improved arrangements whereby precise control of the phase and magnitude of an output voltage is obtained by employing apparatus of moderate size, and which is not expensive to manufacture.

It is an object of my invention to provide new and improved electric control circuits.

It is another object of my invention to provide new and improved control circuits for alternating current systems wherein the phase of an alternating voltage is accurately controllable in response to the voltage of an associated control circuit.

It is a further object of my invention to provide new and improved electric control systems wherein the phase and magnitude of an output voltage are accurately and precisely controllable in response to the voltage of an associated control circuit.

Briefly stated, in the illustrated embodiments of my invention I provide new and improved circuit arrangements for controlling the phase of an alternating voltage with respect to the voltage of an alternating current circuit by transmitting to impedance elements connected in the circuits variable amounts of unidirectional current. The shift in phase or phase displacement is obtained by superimposing on the alternating component of voltage derived from the source variable amounts of unidirectional voltage produced by transmitting different amounts of unidirectional current through the impedance elements.

Figure 1:
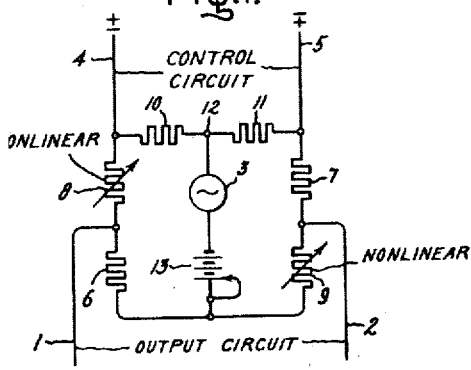
Figure 2:
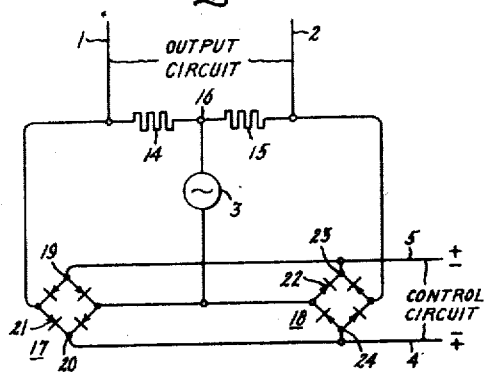
Figure 3:
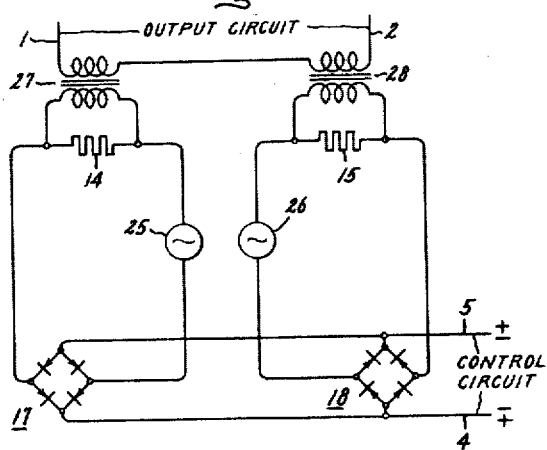
Figure 4:
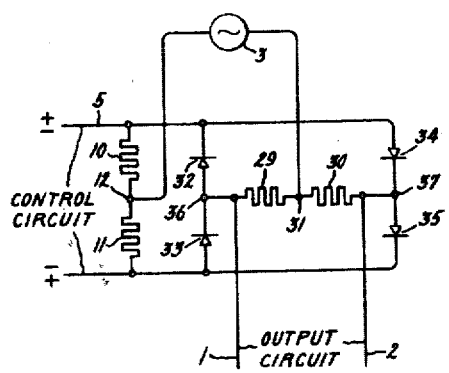

For a better understanding of my invention, reference may be had to the following description taken in connection with the accompanying drawing, and its scope will be pointed out in the appended claims. Fig. 1 diagrammatically illustrates an embodiment of my invention as applied to a bridge-type circuit which is controlled in response to the voltage of a control circuit. Figs. 2, 3 and 4 represent certain modifications of my invention in which selective energization of the impedance elements is obtained by employing unidirectional conducting devices or rectifiers which are poled to transmit unidirectional current through the impedance elements in response to the polarity of the voltage of an associated control circuit.

Referring now to Fig. 1 of the drawing, my invention is there illustrated as applied to a bridge-type circuit for supplying to an output circuit, including conductors 1 and 2, an alternating voltage of variable phase displacement with respect to the voltage of an associated alternating current source 3. The phase relationship of the voltage of the output circuit varies in response to the voltage of an associated control circuit comprising conductors 4 and 5. The control circuit may be of the nature in which the control voltage is reversible in polarity.

The bridge circuit in the arrangement of Fig. 1 may comprise two parallel non-reactive branches including linear resistances 6 and 7 and nonlinear resistances 8 and 9. The nonlinear resistances 8 and 9 may be constructed of a material such as that disclosed in United States Letters Patent No. 1,822,742, granted September 8, 1938, upon an application of Karl B. McEachron and which is assigned to the assignee of the present application, and which has a nonlinear impedance-current characteristic. Of course, it is to be understood that other types of resistances may be employed for resistances 8 and 9, such as fine filamentary resistances energized to have a temperature substantially above the ambient temperature. In place of the nonlinear resistances 8 and 9, suitable rectifying devices, such as contact rectifiers or thermionic rectifiers, may be employed. I connect across the terminals of the control circuit a pair of serially connected resistances 10 and 11, the common juncture 12 of which is connected in series relation with the source of alternating current 3 and a source of unidirectional current 13. The source of unidirectional current 13 is adjustable to provide an arrangement for balancing the bridge, that is, provides an arrangement for balancing the current transmitted through the respective associated branches for a given condition of the control circuit.

The operation of the embodiment of my invention shown in Fig. 1 will be explained when considering the system when it is operating to control the phase of the voltage supplied to the output circuit, including conductors 1 and 2, in response to the voltage of the control circuit including conductors 4 and 5. The bridge circuit is initially adjusted by controlling the effective or output voltage of the source of direct current 13. The variation in the voltage drop appearing across resistances 10 and 11 in response to both the magnitude of the control voltage and the polarity of the control voltage buck and boost the bias currents in resistances 8 and 9, thereby effecting an unbalance of the bridge in response to the control voltage. The phase of the alternating current output voltage is advanced or retarded with respect to the voltage of the alternating current source 3, in response to the polarity of these voltages. Due to the nonlinearity of the resistance elements 8 and 9, it will be understood that the variation in potential difference between conductors 1 and 2 is accentuated. Inasmuch as the resistance elements of the bridge circuit are non-reactive, negligible phase shift occurs between the input and output voltages for variations in frequency of the source 3. Resistances 8 and 9 are chosen to have a very small time constant, thereby complying with the condition of a negligible or very small time interval lag for the transition from one condition of control voltage to a second condition of control voltage.

Fig. 2 diagrammatically illustrates another embodiment of my invention in which a bridge-type circuit is also employed for controlling the phase of the output voltage in response to the voltage of the control circuit. A pair of serially connected resistances 14 and 15 are connected across the conductors 1 and 2 of the output circuit, and the common juncture 16 thereof is connected to one terminal of the alternating current source 3. The bridge circuit comprises two parallel branches, one of which includes a rectifier 17 and the resistance 14, and the other of which includes a rectifier 18 and the resistance 15. The rectifiers 17 and 18 are poled to energize selectively resistances 14 and 15 in response to the polarity of the control voltage. If desired, these rectifiers may be of the bridge type and arranged to transmit alternating current. It will be noted that diagonal terminals 19 and 20 of rectifier 17 are connected to the control circuit, and that the unidirectional conducting devices 21, which constitute branches of the rectifier circuit, are poled to transmit current when the conductor 5 is positive relative to conductor 4. On the other hand, unidirectional conducting devices 22 of rectifier 18 are connected in a manner to conduct current when the reverse condition exists, that is, when the conductor 4 is positive in potential relative to conductor 5. Diagonal terminals 23 and 24 of rectifier 18 are connected to the input circuit, and the other diagonal connections are connected in circuit with resistance 15 and the source 3.

The rectifiers 17 and 18 are also arranged to transmit alternating current, provided by the source 3, through the resistances 14 and 15. It is to be noted that in the arrangement of Fig. 2 it is permissible to omit the auxiliary source of biasing voltage or current.

The embodiment of my invention shown in Fig. 2 operates to control the phase of the alternating voltage supplied to the output circuit in response to the polarity of the voltage of the control circuit. This shift in phase is obtained by combining the alternating component of voltage produced by source 3 with the unidirectional component of voltage appearing across resistances 14 and 15 which are produced by transmitting unidirectional current through these resistances.

Rectifiers 17 and 18 are selectively responsive to the polarity of the control voltage inasmuch as these rectifiers are oppositely poled. Rectifiers 17 and 18 also serve as paths for transmitting the flow of alternating current provided by source 3 through resistances 14 and 15. When the voltage of the control circuit is of one polarity, as for example when conductor 5 is positive relative to conductor 4, unidirectional current is transmitted through resistance 14 to shift the phase of the output voltage in one direction relative to the voltage of the supply circuit 3, and when the reverse polarity condition exists, that is when conductor 4 is positive relative to conductor 5, rectifier 18 transmits unidirectional current to the resistance 15, shifting the phase of the voltage of the output circuit in the opposite direction with respect to the voltage of the source 3. The variation in the relative amounts of current transmitted through the resistances 14 and 15 controls the amount by which the output voltage is shifted in phase relative to the voltage of the source 3.

In the embodiment of my invention shown in Fig. 3, instead of employing a single source of alternating current I provide a pair of sources of alternating current 25 and 26 in order that the two branches of the control system may be independent, thereby minimizing the circulating currents in the rectifiers 17 and 18. Other corresponding elements have been assigned like reference numerals. It will be noted that I connect across the resistances 14 and 15 transformers 27 and 28, respectively, and which are connected in a manner so that the output voltage is alternating.

The embodiment of my invention shown in Fig. 3 operates in substantially the same manner as that explained above in connection with the arrangement shown in Fig. 2, with the exception that the provision of separate sources of alternating current 25 and 26 minimizes the magnitude of the circulating currents which flow through the rectifiers 17 and 18.

In Fig. 4 there is illustrated a still further embodiment of my invention in which a bridge-type circuit is also employed for controlling the phase of the voltage of the output circuit including conductors 1 and 2. I provide in Fig. 4 an arrangement for transmitting unidirectional current through a pair of impedance elements, such as resistances 29 and 30, in response to the polarity of the voltage of the control circuit. The source of alternating current 3 is connected between the common juncture 12 of resistances 10 and 11 and the common juncture 31 of resistances 29 and 30. In order to transmit selectively unidirectional current to resistances 29 and 30 in response to the polarity of the voltage of the control circuit, I provide two pairs of serially connected unidirectional conducting devices such as rectifiers 32, 33 and 34, 35 having common junctures 36 and 37, respectively. The two pairs of unidirectional conducting devices are oppositely poled with respect to the control circuit, and the common junctures 36 and 37 are connected to opposite terminals of resistances 29 and 30. In addition, the pairs of unidirectional conducting devices also transmit the alternating current provided by source 3 through the resistances 27 and 30, so that the voltage appearing across the outside terminals of these resistances and the voltage impressed on the output circuit is an alternating voltage.

The operation of the embodiment of my invention shown in Fig. 4 is substantially the same as that explained above in connection with the arrangement of Fig. 2. The phase of the voltage impressed across the output circuit is selectively advanced or retarded in response to the polarity of the voltage of the control circuit. For control voltage of one polarity one of the resistances 29 or 30 is energized and the output voltage is shifted in one direction with respect to the voltage of source 3. For a control voltage of opposite polarity, the output voltage is shifted in the opposite direction.

While in the above embodiments of my invention it will be appreciated that there is some variation in magnitude of the alternating voltage impressed across the output circuits which occurs coincidentally with the variation in phase relationship of the output voltage with respect to the alternating current source, it will be appreciated that by the proper choice of the constants of the circuit this variation in magnitude may be maintained within a desired and unobjectionable range. Of course, it is to be understood that in some applications it is required not only to obtain a change in phase relationship with the voltage of an associated control circuit, but it is also desirable to obtain a variation in magnitude. It is to be understood that the above described circuit arrangements can be designed to obtain both variation in phase and variation in magnitude in response to the magnitude and polarity of the voltage of an associated control circuit.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a control circuit for producing a variable control voltage, an output circuit, means for producing an alternating voltage, means connected between said control circuit and the last mentioned means for controlling the phase of the voltage impressed on said output circuit with respect to said alternating voltage and in response to said control voltage and comprising a bridge circuit having a pair of parallel non-reactiv branches each including an impedance element, and impedance means connected to said control circuit for controlling the current through said impedance elements in response to said control voltage.

2. In combination, a control circuit for producing a variable control voltage, a source of alternating current, an output circuit, means connected to said control circuit and said source for supplying to said output circuit an alternating voltage of variable phase relation with respect to the voltage of said source comprising a bridge circuit having a pair of parallel non-reactive branches each including an impedance element, said source of alternating current being connected in circuit with both of said branches, and means for supplying to said branches unidirectional current to control the phase displacement of the voltage of said output circuit with respect to the voltage of said source.

3. In combination, a control circuit for producing a variable control voltage, a source of alternating current, an output circuit, means connected between said control circuit and said source for supplying to said output circuit an alternating voltage of variable phase relation with respect to the voltage of said source and responsive to the polarity of the voltage of said control circuit and comprising a bridge circuit having a pair of non-reactive branch circuits, said source of alternating current being connected in circuit with both of said branch circuits, and means for supplying to said branch circuits unidirectional current to control the phase displacement of the voltage of said output circuit with respect to the voltage of said source.

4. In combination, a control circuit for producing a variable control voltage, a source of alternating current, an output circuit, and means connected to said control circuit and said source for supplying to said output circuit an alternating voltage of variable phase relation with respect to the voltage of said source and comprising an exclusively resistance bridge connected to said source and means for supplying to said bridge unidirectional current to control the phase displacement of the voltage supplied to said output circuit.

5. In combination, a direct current control circuit for producing a variable control voltage, a pair of serially connected resistances connected across said control circuit, a bridge circuit comprising a pair of parallel branches each having in series relation a linear resistance and a resistance having a nonlinear impedance-current characteristic, an output circuit connected to the common junctures of the linear resistances and the nonlinear resistances in said parallel branches, a source of alternating current, and a source of direct current connected in series relation between the common juncture of the first mentioned resistances and said parallel branches, the variations in polarity of the voltage of said control circuit serving to control the phase of the voltage of said output circuit with respect to the voltage of said source of alternating current.

6. In combination, a control circuit for producing a unidirectional voltage of either polarity, a source of alternating current, an output circuit, and means for impressing on said output circuit a voltage of variable phase relation with respect to the voltage of said source of alternating current and comprising a bridge circuit including a plurality of branches each having a serially connected linear resistance and a resistance having a nonlinear impedance-current characteristic, the output circuit being connected to the common junctures of the linear and nonlinear resistances in said parallel branches, a pair of resistances connected across said control circuit and a source of unidirectional voltage connected in series relation with said source of alternating current, said source of alternating current and said source of unidirectional current being connected between the common juncture of the last mentioned resistances and the juncture of said parallel branches.

7. In combination, a control circuit for producing a unidirectional voltage of either polarity, a source of alternating current, an output circuit, and means connected between said control circuit and said source for supplying to said output circuit an alternating voltage of variable phase relation with respect to the voltage of said source and comprising a bridge circuit having a pair of parallel non-reactive branches each including in series relation a resistance and a rectifier, the rectifiers being connected to said control circuit and said output circuit being connected across said resistances.

8. In combination, a control circuit for producing a unidirectional voltage of either polarity, a source of alternating current, an output circuit, means connected to said control circuit and said source for supplying to said output circuit an alternating voltage of variable phase relation in response to the voltage of said control circuit and comprising a bridge circuit including a pair of parallel non-reactive branch circuits each including in series relation a rectifier and a resistance, said source of alternating current being connected in circuit with both of said branches and said rectifiers being connected in said control circuit to energize selectively said resistances in response to the polarity of the voltage of said control circuit.

9. In combination, a control circuit for producing a unidirectional voltage of either polarity, a source of alternating current, an output circuit, and means for supplying to said output circuit an alternating voltage of variable phase relation in response to the voltage of said control circuit and comprising a bridge having a pair of parallel branches each including in series relation a resistance and a rectifier connected in said control circuit, said rectifiers being poled to be selectively responsive to the polarity of the voltage of said control circuit and to permit the flow of alternating current from said source through the resistances in both of said parallel branches.

10. In combination, a control circuit for producing a voltage of reversible polarity, a source of alternating current, an output circuit, and means for supplying to said output circuit an alternating voltage of variable phase relation in response to the voltage of said control circuit and comprising a bridge having a pair of parallel branches each including in series relation a resistance and a rectifier connected in said control circuit, said rectifiers being of the full wave type to supply alternating current to the resistance from said source.

11. In combination, a control circuit for producing a voltage of reversible polarity, an output circuit, means for producing an alternating voltage, and means for controlling the phase of the voltage impressed on said output circuit with respect to said alternating voltage and in response to the voltage of said control circuit and comprising a pair of electric circuits connected to the means which produces the alternating voltage and each comprising an impedance element, a pair of rectifiers both connected to said control circuit and being oppositely poled to energize selectively said impedance elements by transmitting thereto unidirectional current in response to the polarity of the voltage of said control circuit.

12. In combination, a control circuit for producing a voltage of reversible polarity, an output circuit, means for producing an alternating voltage, and means for controlling the phase of the voltage impressed on said output circuit with respect to said alternating voltage and in response to the voltage of said control circuit and comprising a pair of electric circuits each including an impedance element, a pair of rectifiers both connected to said control circuit and being poled to energize selectively said impedance elements by transmitting thereto unidirectional current in response to the polarity of the voltage of said control circuit.

13. In combination, a control circuit for producing a voltage of reversible polarity, a source of alternating current, an output circuit, a pair of serially connected resistances connected across said control circuit, and means for controlling the phase of the voltage impressed on said output circuit in response to the voltage of said control circuit and comprising a second pair of serially connected resistances connected to said output circuit, said source of alternating current being connected between the common junctures of the first mentioned pair of resistances and the second mentioned pair of resistances and means for selectively transmitting to the second mentioned resistances unidirectional current in response to the polarity of the voltage of said control circuit and comprising in series relation two pairs of oppositely poled unidirectional conducting devices, the common juncture of the unidirectional conducting devices in each pair being connected to opposite terminals of the second mentioned resistances.

LESLIE CARTER LUDBROOK.